United States Patent [19]

Choi et al.

[11] Patent Number: 5,313,188

[45] Date of Patent: * May 17, 1994

[54] BATTERY-POWERED FLASHING SUPERLUMINESCENT LIGHT EMITTING DIODE SAFETY WARNING LIGHT

[75] Inventors: Robert S. Choi, Landisville; C. Kwai Kong, Mount Joy; Oong Choi, Lancaster, all of Pa.

[73] Assignee: Bell Sports, Inc., Calif.

[*] Notice: The portion of the term of this patent subsequent to Dec. 29, 2009 has been disclaimed.

[21] Appl. No.: 997,201

[22] Filed: Dec. 28, 1992

Related U.S. Application Data

[60] Division of Ser. No. 742,205, Aug. 5, 1991, Pat. No. 5,175,528, which is a continuation of Ser. No. 420,068, Oct. 11, 1989, abandoned.

[51] Int. Cl.$^5$ .......................... G08B 5/00; B60Q 7/00
[52] U.S. Cl. ................... 340/331; 340/321;
340/815.03; 340/432; 340/471; 340/473;
340/908.1; 315/200 A; 362/800
[58] Field of Search ............. 340/331, 332, 321, 432,
340/760, 762, 767, 782, 815.03, 908.1, 471–473;
315/241 R, 200 A, 174; 362/800, 157, 83.3

[56] References Cited

U.S. PATENT DOCUMENTS 5,175,528 12/1992 Choi et al. .................. 340/331

Primary Examiner—Donnie L. Crosland
Attorney, Agent, or Firm—Burns, Doane, Swecker & Mathis

[57] ABSTRACT

A flashing safety warning light in which a superluminescent light-emitting diode (SLD) light source is driven by an oscillatory drive signal at a visually imperceptible but highly efficient operating frequency, the oscillatory drive signal preferably being a pulse signal of 1 to 5 KHz to cause the SLD to be illuminated and extinguished at the oscillatory drive signal frequency, such that extinction of the SLD is not visually perceptible. The oscillatory drive signal is in turn gated on and off in accordance with a gating signal at a low, highly visually perceptible frequency in the range of 3 to 12 Hz with a pulse duty cycle of between 10 to 60% in order to cause the SLD to be visually perceived as flashing on and off at the gating signal frequency in an attention-getting manner. An implementation of the flashing safety warning light for use as a bicycle safety flasher is described, and offers enhanced warning visibility with extended battery life.

5 Claims, 2 Drawing Sheets

BATTERY-POWERED FLASHING SUPERLUMINESCENT LIGHT EMITTING DIODE SAFETY WARNING LIGHT

This application is a divisional of application Ser. No. 07/742,205, filed Aug. 5, 1991, now U.S. Pat. No. 5,175,528, which is a continuation of application Ser. No. 07/420,068, filed on Oct. 11, 1989 now abandoned.

BACKGROUND OF THE INVENTION

The present invention is related in general to flashing warning lights, and, more particularly, to the provision of a high luminous intensity flashing warning light using superluminescent light emitting diodes for improved visibility and lower power consumption than conventional devices.

Flashing (i.e. intermittently or periodically illuminated) lights have long been used to provide visual warnings, and a considerable body of research has been compiled in the fields of psychology and engineering (and more recently in that hybrid field known as "human factors engineering") concerning human perception of flashing light (i.e. the ability of people to perceive and respond to flashing light). From such research and study, a large number of factors have been identified and suggested as involved in the human perception of and reaction to flashing light, and although much knowledge on the subject is theoretically based and remains to be confirmed, there have presently been suggested certain factors which may be applied to the provision of a flashing warning light for improving the visibility of a flashing light, that is, for making a flashing light visible at a greater distance (i.e. "visibility"), and for enhancing the probability that people will not only perceive (i.e. see) the flashing light but will also react consciously thereto (i.e. "attention-getting").

It is suggested for example from the study of human factors that human visual perception of flashing light appears greatest when the light is flashed at a flash rate or frequency in the range of 3 to 10 flashes per second, with a flash duration of at least 0.05 seconds being recommended. Further, for the flashing of a light to be perceived as discrete flashes, the flash rate or frequency must be below the so-called "flicker-fusion" frequency, that is the frequency above which a flashing light appears as a steady light (i.e. due to the phenomenon of "persistence of vision"), this critical frequency being considered to be approximately 24–30 flashes per second.

For simplicity, hereinafter flash rate or frequency will be described in terms of "flashes-per-second" (fps).

Research has revealed other factors to be pertinent concerning perception of light in general, and flashing light in particular. For example, according to Fechner's Law the sensation of light as produced by the eye varies logarithmically with the intensity of the stimulus. Further, it has been found that at low intensities of light, colors cannot be distinguished ("twilight vision"). It has also been found that at low luminous intensities, before twilight vision, there is a distinct shift of the maximum in the visibility curve towards a shorter wavelength, this phenomenon being known as the Purkinje effect. This shift of the spectral visibility curve tends to make color sensations variable quantities.

With respect to the human perception of flashes of light, a number of psychosensory phenomena of interest have been indicated. It has been suggested for example that a number of different "channels" and "systems" of visual perception are present in humans, and that the perception of flashing light stimulus depends upon the action and interaction of these channels in receiving visual stimuli from the rods and cones of the retina of the eye and in transmitting these stimuli to sensory and motor centers of the brain where the stimuli are "perceived" and responded-to. Further, experimental results have suggested that rod and cone signals elicited by a single flash combined in an excitatory fashion. The results of other experimental work have suggested that light flashes of short duration favor one visual sensory channel, while longer duration flashes favor another visual sensory channel. Still further, with respect to the dynamic range of visual sensory perception in humans, it has been found that short (e.g. 4-msec) test flashes presented on backgrounds appear to have less dynamic range (between above and below threshold) than long (e.g. 300-msec) test flashes. Decreasing the intensity of a short flash has surprisingly little effect until a final small adjustment makes a comparatively brig-ht flash suddenly disappear. Dimming a 300-msec flash is more predictable; the flash grows dimmer until it disappears. It has further been found that, incidentally, short test flashes tend to appear as abrupt bursts, whereas long test flashes are frequently seen as in distinct smudges that drift on, then off.

Luminance discrimination has also been experimentally studied, with regard to what psychosensory mechanisms are involved in discerning or seeing light flashes and in discriminating luminance differences between light flashes, in an attempt to establish psychometric curves for these functions. For example, it has been attempted to demonstrate that there are two discrete detection channels, one for long flashes and one for short flashes. Experiments have shown that different slopes are obtained for psychometric curves measured with short and long flashes. The explanation favored is that the visual system is not homogenous; there are at least two detection channels with inherently different slopes, and it is believed that these can be differentially tapped by varying test flash parameters. Results of some experiments tend to confirm this, and suggest that whereas the long flash detection channel is photometrically subtractive or subadditive, the short flash detection channel is photometrically additive and has a much steeper psychometric function slope than the long flash detection channel. It is further suggested that the psychometric function slopes of the different visual sensory channels vary differently as a function of wavelength, and it has been adduced that all three channels of the visual system do not have the same gain but rather differ in spectral sensitivity.

An interesting question concerns the relationship between the light detection and the flicker threshold. When flashes are supplied within a certain interval, they are perceived as being fused and are indistinguishable from continuously supplied light. It has been almost 150 years since it was shown that, under fused circumstances, the mean intensity over time is independent of the actual light-dark ratio. A further question concerns how many extra quanta of light must be added to flashes perceived as fused at the absolute threshold of vision to perceive a flickering light again, or more precisely, in order to see a regular high-frequency flickering light again (since fused light at threshold level is perceived as irregular flickering light). It has been previously shown that the visual perception system's processing of quantal effects at low luminance levels is essentially nonlinear. Flicker can be detected either by the "on response" or by the "off response" of the visual system to a flash of light. In the case of the on response, extra light quanta have to be supplied so that the threshold set by the adaptational state induced by the previous stimuli is exceeded. A larger interval between flashes leads to a lowering of the adaptational state (because of a decrease of the flux) and thus to lower thresholds. In the case of the off response, the excitation state has to decrease by a certain amount in order to exceed the decrement threshold. If flashes last long enough for a stable adaptation level to be reached, then the threshold no longer depends on the actual flash duration. Experimental results have shown that after 100 msec this stable level can be reached and maintained by a constant intensity in the flashes.

With regard to critical fusion frequency as a function of mean intensity at low luminance levels, it is has been suggested that the critical fusion frequency increases from 6 to 25 Hz with increasing stimulus size. It has also been found that, at higher luminance levels, brief flashes need a longer interval to elicit flicker perception than do long-lasting flashes.

Behavioral studies have shown that when attention is directed towards a point in space, stimuli occurring at or near that location receive facilitated processing. This voluntary control over the spatial focus of attention, which can occur even while the eyes remain stationary, has been described metaphorically as an attentional "spotlight". Some authors have suggested that the attentional spotlight has discrete boundaries and that stimuli falling within this "zone of facilitation" show an "all-or-none" enhancement of processing. Other research suggested that the spotlight is probably flexible, changing its size as a function of task demands.

Recent work, however, has indicated that the spatial distribution of attention in many cases takes the form of a "gradient", such that the falloff of enhanced processing in regions surrounding an attended location is gradual rather than all-or-none. The bulk of evidence supporting the gradient concept has come from studies of simple reaction time (RT) in humans; in general, RT was prolonged as a function of target distance from the attended locus. However, a simple RT measurement does not readily distinguish between a facilitation of sensory processing and the biasing of response and decision processes in this type of task. Thus, gradient effects in RT may have been due to response delays resulting from higher decision criteria for events occurring at a distance from the attended location. An additional confounding factor is that the RT method may cause the subject's attention to be partially diverted and divided rather than strictly focused on the to-be-attended stimulus.

Event-related brain potentials (ERPs) have been used in an attempt to evaluate the spatial distribution of visual attention to possibly provide a partial solution to problems in prior attempts. It has been well established in the study of visual-spatial attention in humans that stimuli at an attended location elicit higher-amplitude ERP components between 80 and 250 msec post-stimulus. There is good reason to believe that these enhanced ERP amplitudes reflect a facilitation of early visual processing in the sensory pathways (i.e. channels). The ERP methodology employed in a particular case examined how human observers distribute their sensory processing capacity among the various elements of a visual display during fully focused attention, to investigate whether a spotlight or gradient effect could be detected. Stimulus in the left, right and midline visual fields were used. Attentional gradients were seen as progressive decrements in amplitudes of the ERPs to the lateral stimuli when attention was directed in turn to evoking stimulus, to the midline, and to the opposite-side stimuli.

In summary, it may be concluded that simple flashes of light elicit a whole range of complex responses from the visual system relating to retinal potentials, subcortical potentials, primary-visual-cortex and associated area potentials, and generalized non-specific responses of the cortex.

Various different types of flashing lights have been known to be used for providing visual alert or warning lights, and have employed incandescent lamps, rare gas discharge lamps and, more recently, light emitting diodes as an illumination means, with some associated control circuitry. However, each of these previous types of illumination means has its disadvantages. Further, the design and operation of such previous types of flashing lights did not take into account the various factors such as flash rates and durations for optimizing the psychosensory perception of flashing light. Still further, the previous flashing light devices could not provide effective light output with low power consumption (i.e. efficiency) at desirable high flash rates, or could not do so without severly sacrificing device power consumption and reliability of the light source, and thus could not provide reliable low power operation and were thus not suitable for use in portable light-weight battery powered equipment.

For example, while incandescent light sources have commonly been used in flashing warning lights, there is the problem that, typically, incandescent light sources are not able to come to full brightness and to then cool off to extinction (i.e. turn on and off) within the higher optimum flash rate frequencies for attracting attention; the flashing character of tungsten-filament lamps is typically degraded significantly above flash rates of 9 fps. Furthermore, because of the inherent thermal inertia of incandescent light sources (once turned sufficiently on to emit light, there is a significant delay in extinction to the off state) as shown in FIG. 1, such light sources cannot provide flashes of relatively short duration, nor can such light sources provide adequate on-off contrast when operated at higher flash rates. As a consequence, incandescent light sources are not suitable for use as warning lights at those flash rates and flash duration periods to which human visual perception is most sensitive but are constrained to use at lower frequencies and longer flash periods.

Still further, incandescent lamps are inefficient due to their emission of considerable energy at wavelengths outside the visual spectrum, and suffer inherent increased power loss, thermal inertia and filament degradation when operated at higher intensity and/or flash rates. An incandescent flashing light with adequate intensity for outdoor use usually requires larger size batteries to compensate for the excessive power loss in the form of heat, thus rendering it impractical for applications requiring reasonably small size and light weight necessary for portability. Durability of incandescent flashing lights is also degraded due to the thermal stress on the filament and mechanical shocks received by the filament.

Rare gas discharge lamps (e.g. Xenon, Argon flash tube lamps and strobes), while capable of operation at higher flash rates are, however, limited to extremely short flash durations which cannot be lengthened. Thus, such light sources are incapable of longer flash duty cycle operation. Furthermore, rare gas discharge lamps are relatively expensive and must necessarily be energized with high voltages and currents, and thus flashing warning lights of this type require complex charging and discharging circuits and consume considerable power. Furthermore, a large amount of energy is required to produce the flashing action of a rare-gas lamp; it tends to deplete ordinary batteries quickly if flashed at an optimal frequency of 3 to 12 Hz continuously such as that required by a warning light. Therefore, rare-gas discharge lights for extended flashing time are only feasible where a large power source is available, such as the utility power, or a power generator, but not in a portable application. Furthermore, being glass-encased, gas discharge flash tubes are susceptible to mechanical shock damage and to gas leakage rendering them inoperative.

Ordinary light emitting diodes (LEDs) are relatively durable mechanically and electrically (as long as their current supply is properly limited) and most readily lend themselves to low voltage-low current operation and electronic control for both flash rate frequency and duration. However such ordinary LEDs as have previously been used as light sources in flashing warning lights were of insufficiently low light intensity output. Hence the use of such low luminosity light emitting sources in visual warning devices has been of limited effectiveness, being restricted to subdued light environments such as for indoor activities, or where the ambient or background light level is quite low so that sufficient contrast can be obtained with the relatively dim illumination intensity of ordinary LEDs to render them visible against a background. Thus, ordinary LED flashers have only found wide application in toys, jewelry and other devices where visibility requirements are not critical. Examples of such prior devices are found disclosed in U.S. Pat. Nos. 3,786,246 and 3,812,614 (flying disc type toys); U.S. Pat. No. 4,308,572 (clothing ornament); U.S. Pat. No. 4,170,036 (jewelry); and U.S. Pat. No. 4,383,244 (skate wheel).

In order to be both effective and practical, a portable warning light should satisfy at least the following requirements:

1. Adequate visibility, and in an attention-getting manner. This involves considerations of various factors such as: the luminous intensity as well as the on-off contrast ratio of the light source; flash rate/frequency; and flash duration/period.

2. Controllability. This involves the relative ease of controlling the light source for effective flash rate frequency and flash duration.

3. Extended operating battery life. This is a critical factor and requires balancing the interdependent factors of the power available, the light output intensity, and the permissible weight of the device.

4. Durable. This requirement concerns the reliability of the device.

5. Light weight and small size. This requirement constrains the use of large and/or heavy batteries and thus affects the available power, limiting permissible power consumption in order to achieve adequate operating life.

6. Cost. This is often of paramount concern since complex devices not only adversely affect economy in manufacture, but also the applicability of such devices to use by consumers.

Unfortunately, although numerous prior flashing light devices are known, these prior devices have failed to meet or satisfy all of the above-noted requirements for use in a portable flashing warning light.

Portable warning flashers have wide usefulness, one particularly useful application of a portable flashing warning light being as a bicycle or jogger warning signal flasher for alerting vehicular traffic to the presence of bicycles and joggers. Bicycles are frequently ridden on or alongside heavily traveled motor vehicle thoroughfares. Similarly, joggers often run alongside roads and bicycle and jogging paths are often established alongside roads and highways, and may cross roads frequently. In metropolitan areas where traffic is heavy and fast moving during morning and evening rush hours, joggers, pedestrians and bicycle riders are frequently found on and alongside streets, roads and highways during periods of heavy traffic since at these times children may be making their way to and from school, people may be commuting to and from work on bicycles, and joggers often prefer to run during the morning and early evening hours due to cooler conditions at those times. Concomitant with the presence of pedestrians, joggers and bicyclists along vehicular roadways during the early morning and early evening is the fact that, especially during the darker winter months, the risng or setting sun is relatively low on the horizon at such times so that natural outdoor ambient light levels may be low while still not being so dark as to require vehicle drivers to have their headlights on, making it difficult for drivers of motor vehicles to actually discern bicyclists, pedestrians and joggers until they are quite close. Similarly, at dawn and twilight, vision is difficult because of low natural light levels and because of the eyes' difficulty in adapting quickly to the changing from dark to light and vice versa, along with the above-noted shifting of the eyes' spectral response at such times. Such factors, combined with the concentration demands placed upon drivers during heavy traffic conditions, make it difficult for drivers to see bicyclists, joggers and pedestrians along roadways during those times when it is most likely that they will be present, and thus there is a great need for a means of effectively alerting drivers to the presence of bicyclists, joggers and pedestrians along roadways during darkness and semi-darkness.

To be effective, such an alert device should attract a driver's attention at as great a distance as possible from the bicyclist, jogger, etc., given the line of sight situation, so that the driver will have adequate notice and may take appropriate precaution while still approaching and before arriving upon the bicyclist or jogger. This requires first and foremost that the alert signal attract the driver's attention, i.e. be visible, perceptible and noticeable so that the driver will be made aware thereby of the bicyclist's or jogger's presence as early as possible.

Various prior safety flasher light devices have been proposed along these lines. Exemplary of such prior devices are those safety lights disclosed in U.S. Pat. Nos. 4,423,473 and 4,451,871. In these devices, a penlight battery power supply is coupled to an ordinary LED mounted within a lensed refelector housing by means of a position sensitive mercury switch, so that, when the device is worn or carried, the position sensitive switch will on account of sensing the wearer's movements connect power to the LED to cause intermittent bursts of light to be emitted thereby. It is described that because power is supplied only intermittently to the LED, the light source LED may be operated from a battery source which provides current to the light source LED in excess of its maximum current rating to provide light of greater intensity than is normally producible from such light source (i.e. an ordinary low luminosity LED). Such a device however does not produce flashes at any particular effective flash rate (apart from being responsive to the rhythm of the wearer's motions sensed thereby), nor of any particular flash duration and thus is not optimal for attracting attention, nor reliable since it regularly will subject the LED to an overcurrent condition which, while perhaps brief, risks damaging the LED junction nevertheless should the mercury switch connection remain on for too long. Another motion-switched intermittently flashed safety light device is disclosed from U.S. Pat. No. 4,535,392.

In U.S. Pat. No. 4,523,258 there is disclosed a safety belt with flashing LEDs for joggers in which an array of LEDs arranged along a reflective belt are connected to a battery-powered oscillator circuit including two separate oscillators, one oscillating at <1 to 5 Hz, and another oscillating at 3 Hz. Sets or subsets of the LEDs in the array are alternately driven by connecting these oscillators to opposite nodes of the array, such that one oscillator forwardly biases the LEDs and the other oscillator reversely biases the LEDs, such that LEDs of different sets are driven only when forwardly biased and thus flash alternately. However, such a device is only suitable for low ambient light conditions.

In U S. Pat. No. 4,819,135 there is shown a bicycle lighting device in which strings of LEDs are mounted along the frame tubes of a bicycle and flashed in sequence to provide a broadside flashing triangular slow moving vehicle signal to motorists. U.S. Pat. No. 4,763,230 shows a string of LEDs adapted to be secured to the spokes of a bicycle wheel.

Other portable safety flasher lights are known from U.S. Pat. Nos. 3,153,745; 3,840,853; and 4,323,879. Flashing or blinking signal light devices for bicycles and other vehicles are also known from U.S. Pat. Nos. 2,661,406; 3,764,976; 3,916,377; 3,974,369; 3,987,409; 4,019,171; 4,388,559; 4,550,305; 4,598,339; and 4,692,736.

Devices using flashing LEDs are also known from U.S. Pat. Nos. 3,737,722; 4,228,484; and 4,228,485. U.S. Pat. No. 4,271,408 discloses an array of LEDs mounted on a reflectorized substrate to form a colored light source, for use in signs. U.S. Pat. No. 4,654,629 discloses a vehicle marker light for end-of-train equipment use having arrays of LEDs which are driven to be flashed at prescribed or different flash repetition rates at night or during other low visibility conditions.

However, none of the known devices satisfactorily meet the myriad requirements for an effective portable safety warning flasher of high attention-getting visibility at low power consumption and light weight with low cost and high reliability, and thus there has remained a need for a device which can satisfy these requirements.

SUMMARY OF THE INVENTION

The present invention takes advantage of the unique characteristics of recently commercially available so-called "Superluminescent" or "Superbright" light-emitting diodes (otherwise known simply as "superluminescent diodes" and abbreviated hereinafter for convenience as "SLDs"). SLDs are known for example from U.S. Pat. No. 4,634,928 and have semiconductor device constructions which provide relatively broad spectral width light output when operating at relatively high powers. Commercially available SLDs emit light at powers as high as 4–6 milliwatts or more in steady state, and are relatively inexpensive, not being very much more costly than ordinary low-luminosity LEDs. For example, the "Radio Shack" catalog lists as available a 5,000 mcd SLD (No. 276-086), and a 2,000 mcd SLD rated at 20 milliamp at 1.85VDC (No. 276-087) as well as a blinking high intensity GaAlAs device with 1,200 mcd output and an 8° viewing angle and rated at approximately 40 milliamps at 1.7VDC (no. 276-020).

For purposes of the present description, a superluminescent light emitting diode (SLD) may be defined as one which has a light output (luminosity) of 1,000 mcd or more at a nominal forward current of 20 milliAmperes.

Furthermore, an SLD consumes only 20 milliAmperes to generate its rated nominal light output (above 1,000 mcd). Since light emitted from an SLD is generated by the quantum release of light energy by excited electrons at the P-N junction of the diode (rather than by thermal radiation), its efficiency while less than that of other electroluminescent devices is still phenomenal especially when compared with conventional light sources since the light output spectrum of an SLD can be selected to fall completely within the visible range and the spectral bandwidth of the light output can be varied to increase with increasing optical output power. Higher operating power can be achieved in a pulse mode, and pulsed radiation output power of 50 mW has been obtained from SLDs.

The present invention uses a unique double oscillation circuit to effect the flashing of one or more SLDs. The present invention takes advantage of the short rise and fall time of an SLD, typically in a fraction of a microsecond; the present invention provides a novel method of pulsing an SLD between the full on and full off states in the attention getting frequencies of 3 to 12 Hz. The duty cycle of an SLD can be easily varied, preferably between 0 to 40%, to maintain a high on-off contrast ratio which further enhances the perceptibility of the light. In general, the double oscillator circuit allows a low frequency pulse drive signal (3 Hz to 12 Hz) to "gate" a high frequency (1 kHz to 5 kHz) drive pulse train (FIG. 2). By doing so, the emitted light appears to the human eye as 3 to 12 Hz flashes, while the SLD is actually being pulsed at the most efficient high frequency range (above 1 kHz) during the on-time of the low frequency period. Since the human eye cannot resolve pulsing light above 30 Hz, the high frequency pulsing above 1 kHz occurring during the "on time" period of the low frequency duration will appear only as a continuous illumination within each low frequency pulse period.

The present invention can advantageously and easily be embodied and implemented in a portable flashing safety warning light for use by bicyclists and joggers and provides high visibility at long range while consuming minimum power for thus achieving extended operating life in a reliable and effective manner. The present invention provides a safety warning light device that flashes at an attention getting rate with high luminosity, previously not feasible without severely sacrificing device power consumption or reliability of the light source. Because of the extraordinary power efficiency achieved in accordance with the present invention, the present invention can be operated on ordinary dry cells, yet while achieving long operating battery life. This is one of the outstanding benefits of this invention, and previously not achieved.

BRIEF DESCRIPTION OF THE DRAWINGS

The features and advantages of the present invention will be made more apparent from the following detailed description taken together with the accompanying drawing figures, in which

FIGS. 5a through 5c show views of a portable bicycle safety flasher warning light in accordance with the present invention; and FIGS. 6A-6B is a timing chart showing waveforms of drive signals for illuminating respective differently colored light sources in accordance with another aspect of the present invention.

DETAILED DESCRIPTION OF THE INVENTION

Figure 1A:
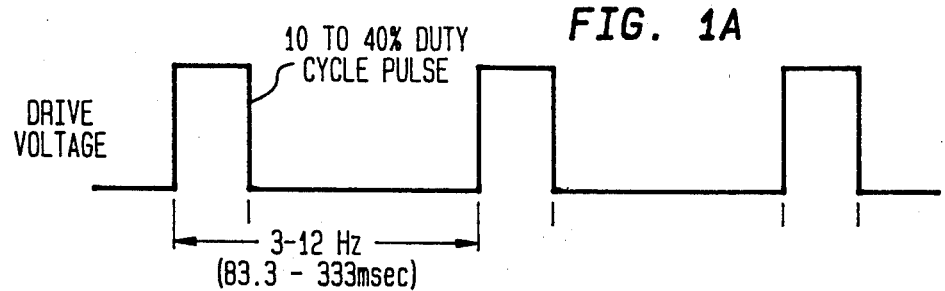
FIGS. 1A-1C shows a graphical comparison between the characteristics of incandescent light sources and superluminescent diodes when flashed for short flash durations.
Figure 1B:
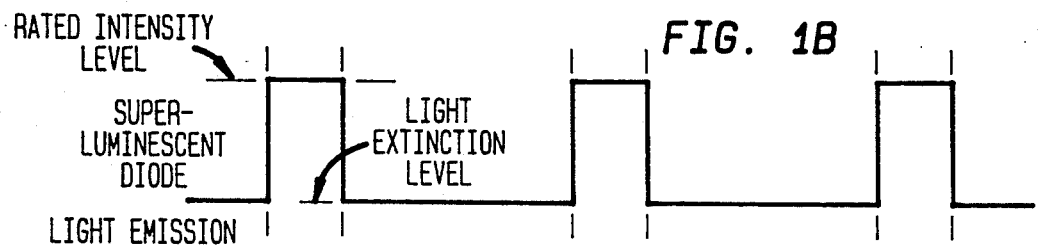
Figure 1C:
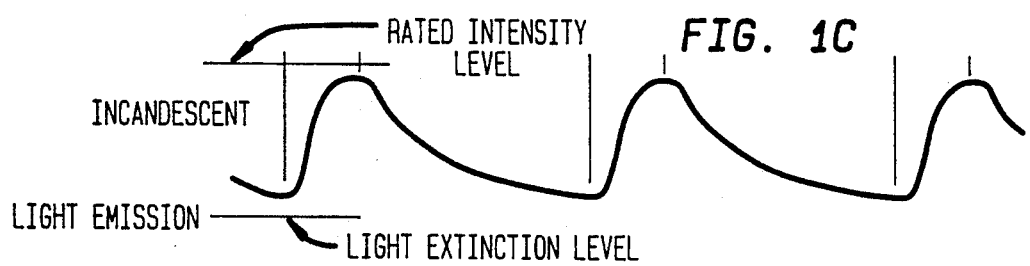

As shown in FIG. 1, a superluminescent diode (SLD) can be easily driven from minimum to maximum luminous intensity when pulsed with a drive current having a pulse frequency of 3 to 12 HZ and a pulse duty cycle of 10 to 40%, in comparison with an incandescent light source (e.g. a tungsten filament lamp) which suffers from thermal inertia and is frequency limited with poor contrast characteristics between its on and off states. That is, the incandescent light source driven with a high frequency (3-12 Hz) pulsed DC voltage has the characteristic that it does not quickly attain a luminous state (i.e. lags) from an off state, does not reach maximum luminosity before the drive pulse voltage changes from on to off, and even more slowly changes from its reached maximum luminosity level to a light extinction level, so that on-off contrast of the light output is poor. This is why an incandescent lamp cannot provide adequate on-off contrast when flashed at higher rates.

On the other hand, SLDs operating at 3-12 Hz easily attain full-on luminosity and full-off darkness at duty cycles of 10-40% as shown, and thus can provide excellent contrast ratio between their on and off states, along with superior luminosity output levels in excess of 1,000 mcd. Suitable SLDs having various luminosity ratings and spectral range are commercially available at modest cost for use in a device according to the present invention. One SLD which has been used successfully is a GaAlAs/GaAs red SLD model no. GL5LR43 manufactured by Sharp Corporation of Japan and rated for a luminous intensity of 600 minimum/1,199 maximum mcd (A rank)-1,200 minimum/2,400 maximum mcd (B rank) at a forward current of 20 ma, having peak emission at 660 nm with 20 nm radiation bandwidth per the manufacturer's specifications. Rated power dissipation is 110 mW, and peak forward current is rated at 300 ma at a duty ratio equal to 1/16 and pulse width equal to or less than 1 ms.

Figure 2A:
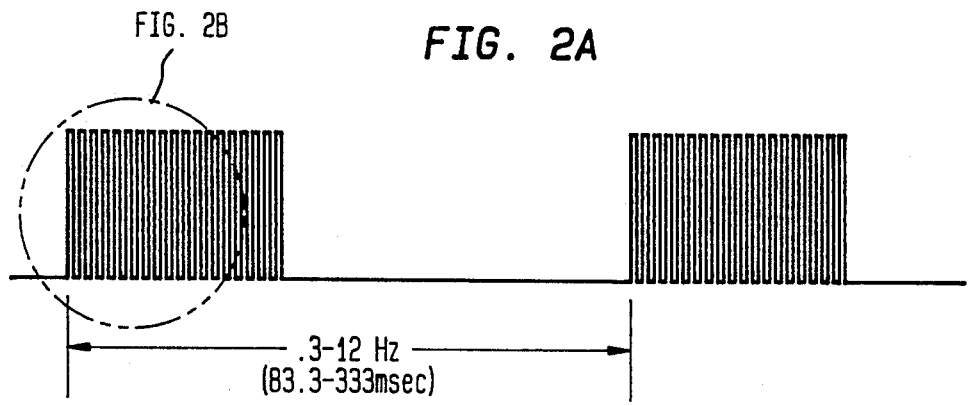
FIG. 2 illustrates an examplary signal waveform of a drive signal provided by the double oscillation circuit in accordance with the present invention.
Figure 2B:
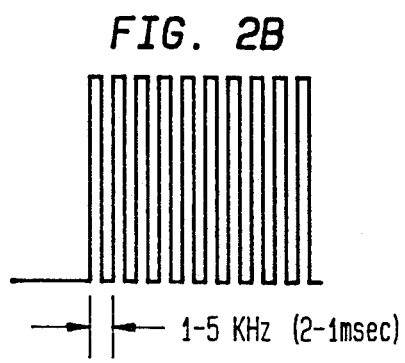

FIG. 2 illustrates graphically the concept of generating a series of high frequency pulses at e.g. 1 to 5 KHz and modulating or gating this high frequency pulse train on and off periodically in accordance with a second low frequency pulse signal at e.g. 3 to 12 Hz obtain a resultant low frequency pulse train in which each pulse of the resultant pulse train consists in turn of a train of high frequency pulses. It is seen that the pulse duration of each of the high frequency pulses falls with the approximate range of 0.2-1.0 msec, while the interpulse interval of the low frequency gating signal and of the resultant gated pulse trains is within the range of approximately 83.3 to 333 msec.

An important aspect of the present invention is a unique double oscillation circuit, which can be applied to take full advantage of the SLD(s)' ease of pulsing operation to further increase the overall device efficiency.

Figure 3:
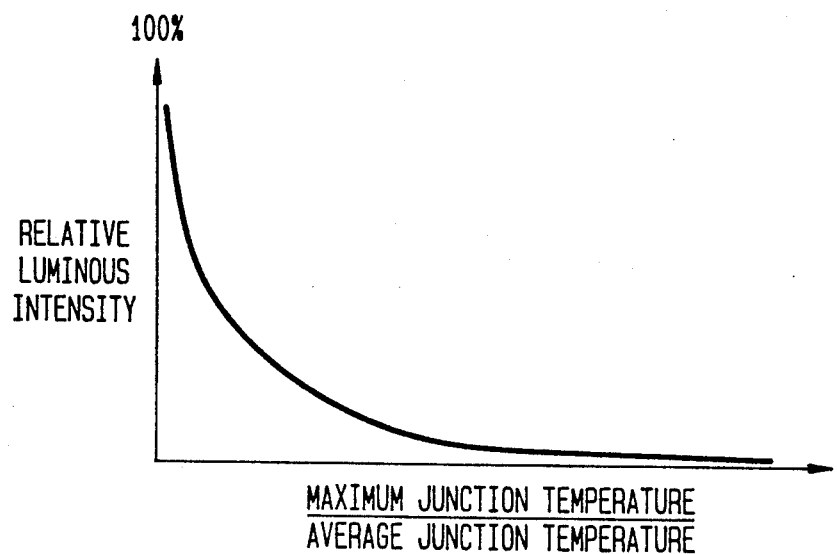
FIG. 3 is a graph illustrating the characteristics of a typical superluminescent diode.

It is important to note that the maximum P-N junction temperature (rather than the average junction temperature) governs the performance of an SLD as to its average power dissipation and light output, while operating in the pulse mode. The lower the maximum junction temperature as a ratio to the average junction temperature, the greater the relative light luminosity, which results in lower power consumption for a given amount of light intensity, as depicted in the graph of FIG. 3. As a rule of thumb, it is recommended that SLDs should be pulsed at 1 kHz or higher frequencies to minimize the ratio of maximum junction temperature to average junction temperature in order to maximize device efficiency. It is good practice, however, to keep the actual pulsing frequency of SLDs below 5 kHz to minimize "switching loss" of the power driver used to turn the SLD(s) on and off.

Figure 4:
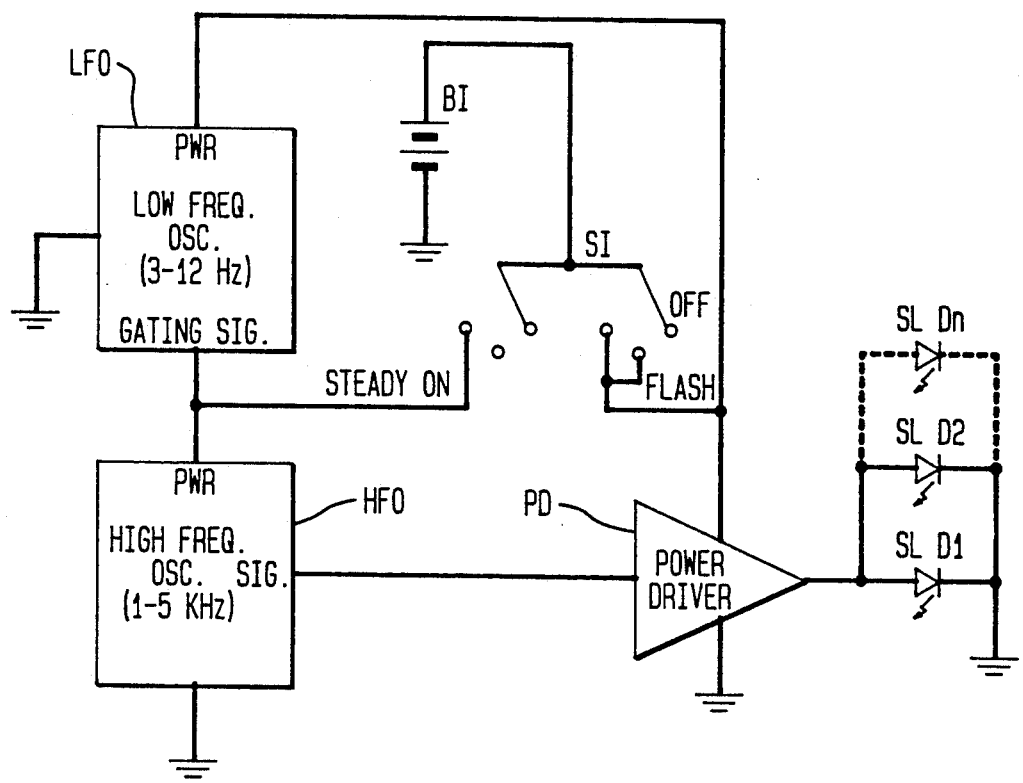
FIG. 4 is a schematic block circuit diagram of a preferred embodiment of the present invention.

Shown in FIG. 4 is a double oscillator SLD flasher circuit which embodies the concept of the present invention. Basically, the double oscillator circuit allows a low frequency pulse drive signal (3 Hz to 12 Hz) to "gate" a high frequency (1 kHz to 5 kHz) drive pulse signal, in accordance with FIG. 2. By doing so, the emitted light from the SLD appears to the human eye as 3 to 12 Hz flashes, while the SLD is actually being pulsed at the most efficient high frequency rate (above 1 kHz) during the on-time of the low frequency gate signal period. Since the human eye cannot resolve pulsing light above 30 Hz, the high frequency pulsing above 1 kHz occurring during the "on time" period of the low frequency gate signal duration will appear only as a continuous illumination within each low frequency gate pulse period.

As shown in FIG. 4, the present invention may preferably be embodied to include a battery source B1, a double pole-triple throw (2P3T) switch S1, one or a series of superluminescent diodes SLD1 to SLDn, a power driver PD, a low frequency oscillator LFO and a high frequency oscillator HFO.

Power to the entire device is supplied conveniently by a set of ordinary dry cell batteries. As S1 is switched to the "Flash" position, battery power is applied from B1 to the low frequency oscillator LFO. The application of power to the low frequency oscillator LFO causes a low frequency pulse gating signal to be generated at the gate signal output of LFO. For instance, FIG. 4 indicates that an 8 Hz pulse gating signal of 25% duty ratio (31.25 ms on-time out of a pulse period of 125 ms) is generated.

This gating signal output from LFO is then fed directly into the power input of the high frequency oscillator HFO, and causes the high frequency oscillator HFO to oscillate at a predetermined high frequency (for example, 1 kHz at 50% duty ratio), during the 31.25 ms of on time of the gating signal from the low frequency oscillator LFO.

The resultant gated oscillatory signal generated by the high frequency oscillator HFO resembles that which is depicted in FIG. 2, and is used to energize the power driver PD. The power driver PD may be simply a solid state power switch (such as a bipolar power transistor, a power MOSFET, etc.) which can be rapidly switched to turn the superluminescent diodes SLD1-SLDn on and off. The power driver PD switch can be driven in the "saturation" mode, such that power loss is minimized. The power driver PD can also incorporate a resistive element to effectively limit the peak current to be drawn by the superluminescent diodes SLD1-SLDn below the maximum rated current.

Therefore, in the example depicted in FIG. 4, the result of turning S1 to the "Flash" position is to generate an eye-catching high brightness flashing light signal which is perceived by the human eye to be flashing at a flash rate of 8 Hz with a crisp contrast obtained by an apparent 25% duty ratio, while the superluminescent diodes SLD1-SLDn are actually each being flashed at a visually imperceptible high flash frequency of 1 kHz at 50% duty cycle, which is a much more efficient operating condition than the lower 8 Hz apparent flash rate perceived.

Another function of the device can be achieved by turning S1 to the "Steady On" position. The high frequency oscillator HFO then receives power directly from the battery source B1. Thus, the high frequency oscillator HFO will then continuously oscillate over the entire period of time switch S1 remains in the "steady on" position, regardless of the gating signal of the low frequency oscillator LFO. Since human eye cannot resolve visual signals above 30 Hz, this operation therefore provides an apparently steady continuous light to the human eye, while the superluminescent diode(s) is actually flashing at a high frequency where power dissipation is minimized.

The details of the high frequency oscillator HFO and the low frequency oscillator LFO are not otherwise depicted because many oscillator configurations can be used for this purpose and the construction of such oscillators will be well within the capabilities of those possessing ordinary skill in the art. It should be noted, however, that in view of the low power consumption and manufacturing cost considerations, oscillator configurations based on one or two discrete transistors are preferred. Furthermore, using known techniques for selecting circuit components and operating parameters, flash rate and duration may be easily varied and optimized as desired, e.g. to provide abrupt short pulses with interpulse intervals selected to optimize the ability of the eye to perceive the flashes in accordance with psychosensory precepts as discussed above. Therefore, it should be understood that the parameters described above are merely illustrative of effective operation of the present invention, and that the invention admits of various implementations and modification within the scope thereof.

As depicted in FIG. 4, a single superluminescent diode or a multitude of SLDs can be used for this device. The use of multiple SLDs involves balancing the nominally increased power consumed by multiple light sources against the benefit of increased luminous output obtained. However, because the mode of operating the SLD at a high frequency described above is highly efficient, multiple SLDs can be used without substantial sacrifice in battery life.

Due to the highly directional emission nature and small size of the SLD(s), the present invention can be implemented such that multiple SLDs can be arrayed in different geometric shapes with uniform light distribution. This flexibility is useful in creating warning lights which convey specific meanings by specific geometric shapes. For example, an multitude of SLDs can be grouped to outline a triangular shape to warn motorists of a slow moving vehicle.

The present invention can be used with multiple SLDs of a single emission color or with multiple SLDs of different emission colors. When groups of SLDs of different emission colors are used, these groups of differently colored SLDs can be turned on and off simultaneously to produce, by the additive photonic light emission effected thereby, a color different from that emitted by any of the SLDs singly. Furthermore, groups of multiple color SLDs can be operated in such a way that each color group of SLDs are turned on and off simultaneously and sequentially in a manner that produces leading and trailing effects in combination with the chosen colors. In this way, even greater spectral width of the light output can be obtained, compensating for the spectral shift in the eye's response to light as may occur at twilight and dawn, and providing an enhanced visually perceptible effect for attracting the attention of observers.

FIGS. 5a through 5c depict a possible practical implementation of the flashing safety warning light according to the present invention. A particular implementation in the form of a bicycle safety flasher light 10 might consist of two SLDs, an electronic circuit board, and a battery holder housing a pair of AA alkaline batteries (not shown), all enclosed in a water proof package 20. A reflector (not shown) is placed behind the SLDs to reflect side and rear emissions to the front, while a fresnel lens 30 is placed in front of the two SLDs to disperse the emitted light uniformly. A three position switch 40 is provided to facilitate selecting the "Off", "Steady On" and "Flash" modes of the device. A visor 50 is located above the fresnel lens 30 to block out ambient light in order to enhance the contrast under various ambient light conditions.

Using two 2,000 mcd SLDs, this particular implementaion of the present invention as shown in FIG. 5 provides a high intensity rapidly flashing light output having visibility up to 1 mile distance at night, with battery life of over 200 hours of continuous operation, using two AA alkaline batteries for power. The device weighs no more than 4.5 Oz., with dimensions of approximately 1.3"(H)×1.3"(D)×2.5"(L) and is only 4.225 cubic inches in volume. The unit 10 can be for example clamped to the rear of a bicycle seat post or otherwise mounted or worn so as to present the light flashes emitted therefrom to the visual range of sight of motor vehicle drivers following behind and coming upon the bicycle rider, thereby giving drivers clear and early warning of the presence of the slower moving bicycle ahead, and this visual warning will be accomplished at a distance far greater than that which might occur merely from reflection of the vehicle headlights on a bicycle rear reflector since this latter warning will only occur when the fast moving vehicle approaches closely proximity to (i.e. within its headlight range of) the bicyclist.

FIG. 6 is a timing chart showing the relation between two drive pulse train signals R and G applied respectively to two respective (or groups of respective) different color-emitting SLDs, for providing unique color visual effects in accordance with a further aspect of the invention. It should be understood that the pulses of signals R and G may preferably in turn consist of gated trains of high frequency pulses as in the drive technique described previously, or each of the depicted pulses of signals R and G may be discrete high frequency pulses. An important aspect of the present invention is that, as noted previously, it is not limited to flashing SLDs of only a single color. Rather, it is possible, by juxtaposing two or three SLDs (or groups of SLDs) of different colors and turning each differently colored SLD (or group) on consecutively or simultaneously, one can achieve a wide variety of colors and luminosities. And where high visibility over a long distance is not required, these techniques are not limited to SLDs but may also be applied in driving ordinary low-luminosity LEDs to obtain similar visual effects.

For example, with reference to the timing chart in FIG. 6, when an e.g. red emitting SLD is juxtaposed with an SLD of a different emission- color, e.g. a green emitting SLD, and the red SLD is turned on (e.g. supplied with a gated train of high frequency pulses or with a single long low frequency pulse) an observer will perceive red light being emitted therefrom. However, if, just prior to turning off the red SLD, the green SLD is turned on, both red and green light will be then emitted simultaneously by the respectively illuminated SLDs, and the combined two primary color wavelength emissions of red and green light will, if the SLDs are juxtaposed sufficiently close to one another that their respective emissions are also juxtaposed and if their respective luminosities are substantially equal, be perceived as a single emission of yellow or amber light, i.e. the additive sum of the primary red and green colored light, effecting a change in the color of emitted light perceived by the observer from red to yellow, as shown in FIG. 6. Then in time, when the signal driving the red SLD goes low (i.e. to zero or below the emission threshold of the SLD) the green SLD will remain turned on, effecting a change in the color of the emitted light perceived by the observer from yellow to green.

Furthermore, it is believed that the effect of the changing colors of emitted light effects in this manner are perceived by the observer more dramatically or psychodelically due to the attributes of image retention of images perceived moments before and of complementary color aftereffects in the human visual perecption system. This psychodelic color change of a single light source (i.e. closely juxtaposed SLDs) provides an enhancement in attracting attention to the flashing light source, making for an unusually effective visual warning light device. It will be appreciated that the different drive signals may be obtained in known fashion by various means well within the capabilities of those of ordinary skill in the art given the present description, for example by providing a pair of high and low frequency oscillators HFO and LFO and offsetting the relative timing thereof to obtain pulse overlap in the drive signals applied to the respective power drivers of the different colored SLDs. Still further, more than two colors of SLDs may be juxtaposed, for example red, green and blue and other effects obtained. Even further, the amount of signal overlap of the respective drive signals may be varied in order to vary the duration of each perceived color, e.g. to make one color be perceived as more dominant, or the duration of the pulses applied to different SLDs may be varied in order to, for example, make one color be pereceived as more prominent.

Furthermore, because of the combination of high luminosity afforded by the utilization of SLDs, the novel drive techniques implemented herein therefor and the tailoring of the flash rate and duration made possible by the present invention, the flashing light output signal from the present invention may be easily optimized for attracting attention in a manner offering a significant optical or visual effect enhancement over conventional warning lights, in accordance with psychosensory precepts, while providing a compact, simple low cost flashing safety warning light device having substantially improved reliability and long operating life with inexpensive low voltage battery power.

The present invention is amenable to various implementations for flashing safety warning lights, both portable and otherwise. One possible implementation is as an "electronic flare", e.g. for disabled vehicles. Another possible implementation is as a substitute for the incandescent "blinker" lights as are commonly mounted on saw-horse stands for marking hazards and construction areas along roadways, with the benefit of extended operating life and reliability. And as noted above, portable safety flashers are also usable by pedestrians and joggers for alerting motorists to their presence on and alongside roadways. It is contemplated that the flashing safety warning light according to the present invention may be implemented in various different embodiments without departing-.from the scope of the invention, which is intended to be limited only by the appended claims.

What is claimed:
1. A flashing safety warning light, comprising:
   a light source comprising at least one superluminescent light emitting diode;
   a power source for activating said superluminescent light emitting diode; and
   a gating means for gating the application of power rom said power source to said light source in pulses at a frequency in the range of 3–12 Hz and with a pulse duty cycle in the range from 10–60%, to thereby cause said light source to be illuminated and extinguished at a visually perceptible rate.
2. The flashing safety warning light of claim 1, wherein said pulses have a frequency of about 8 Hz.
3. The flashing safety warning light of claim 1, wherein said pulses have a duty cycle in the range of 10–40%.
4. The flashing safety warning light of claim 3, wherein said duty cycle is about 25%.
5. The flashing safety warning light of claim 1, wherein said light source comprises at least two superluminescent diodes each having a different emission spectral color, and wherein each of said superluminescent diodes is activated simultaneously during at least a part of each of said pulses to produce an additively colored light output different in color from that of each individual superluminescent diode.

* * * * *